Jan. 31, 1961 F. H. OSBORNE ET AL 2,969,704
MECHANISM FOR PLAYING CHORDS
Filed July 8, 1958 6 Sheets-Sheet 1

INVENTORS.
Fred H. Osborne
Howard G. Bauer
Robert S. Tuttle
By: Olson & Trexler attys

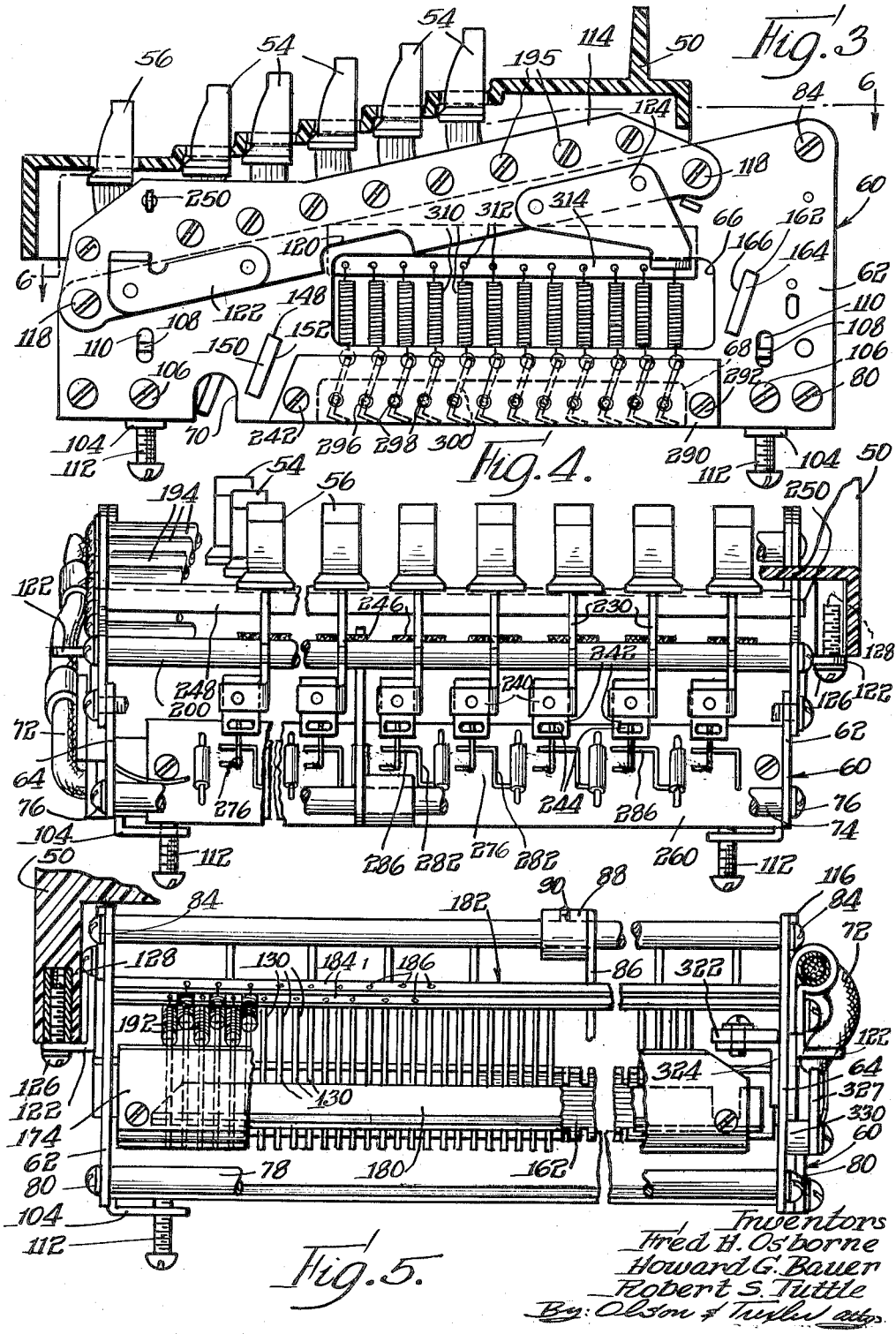

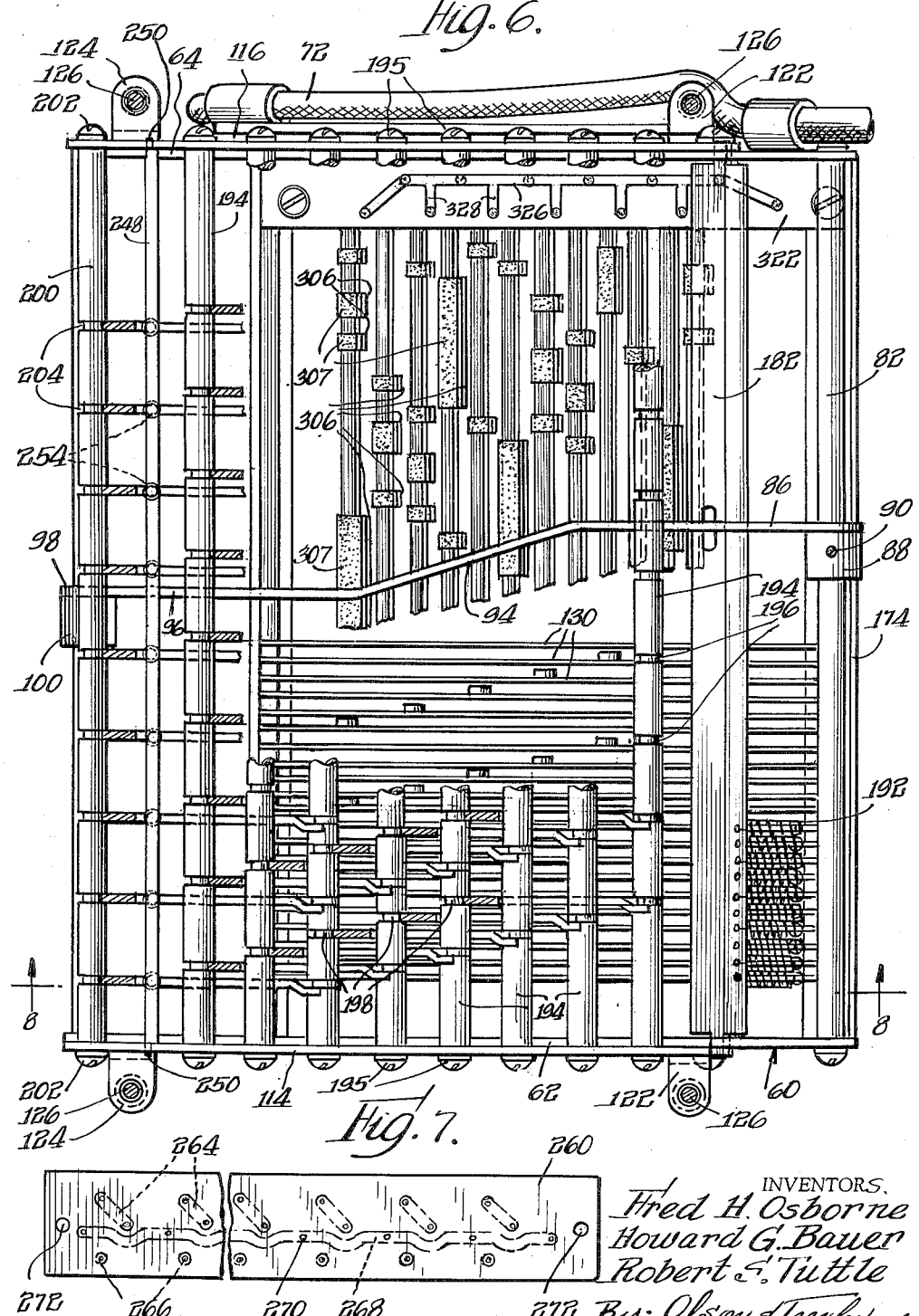

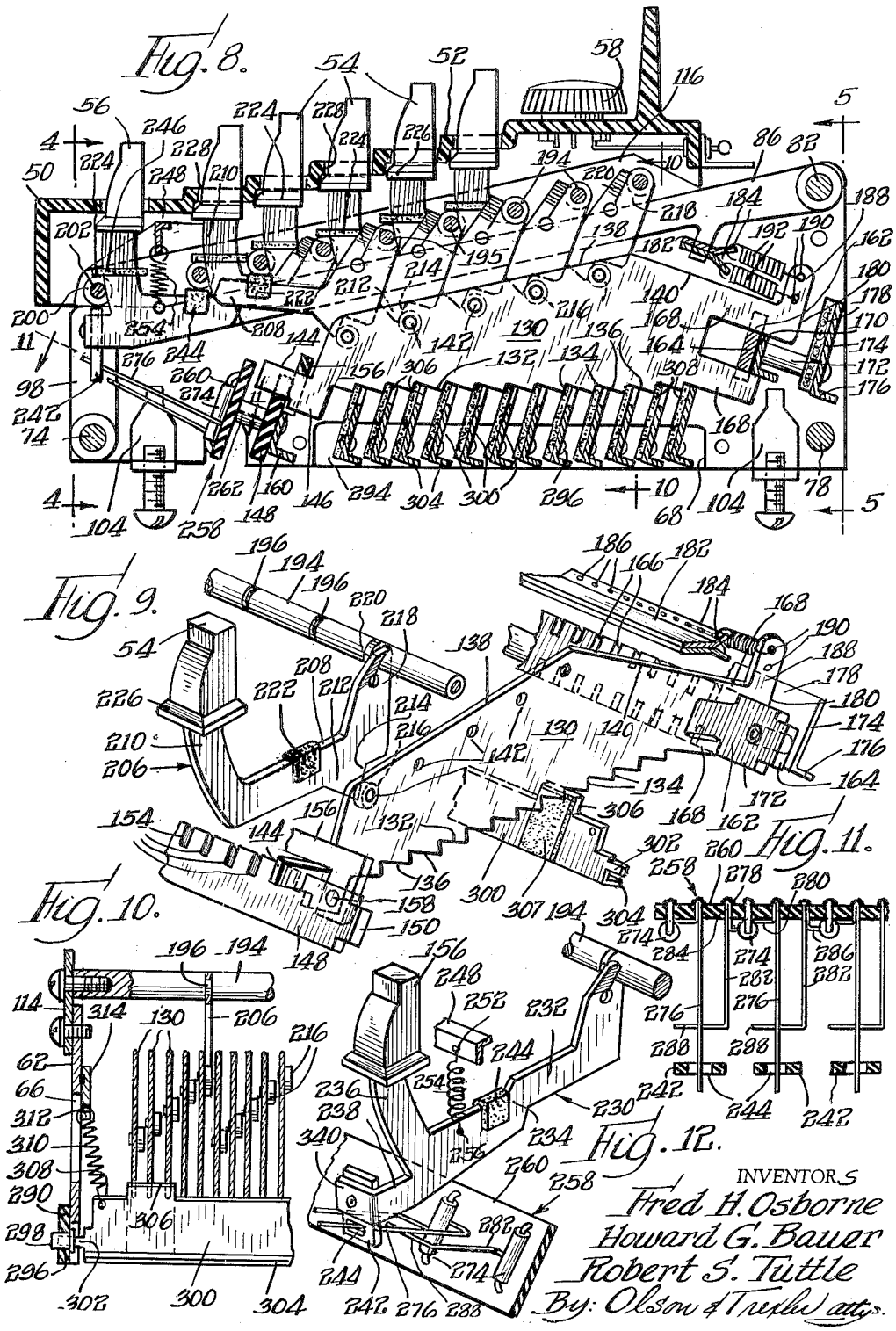

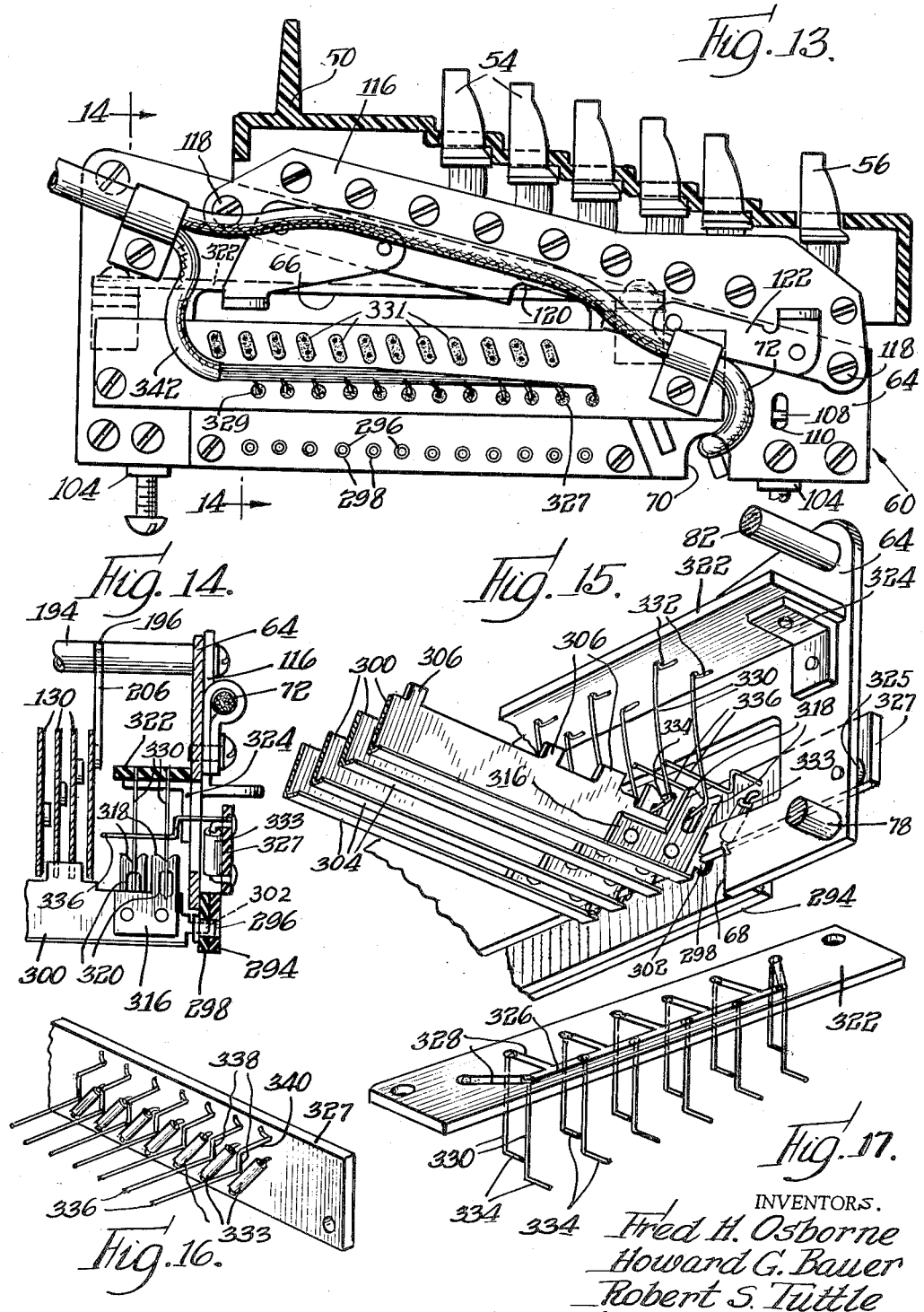

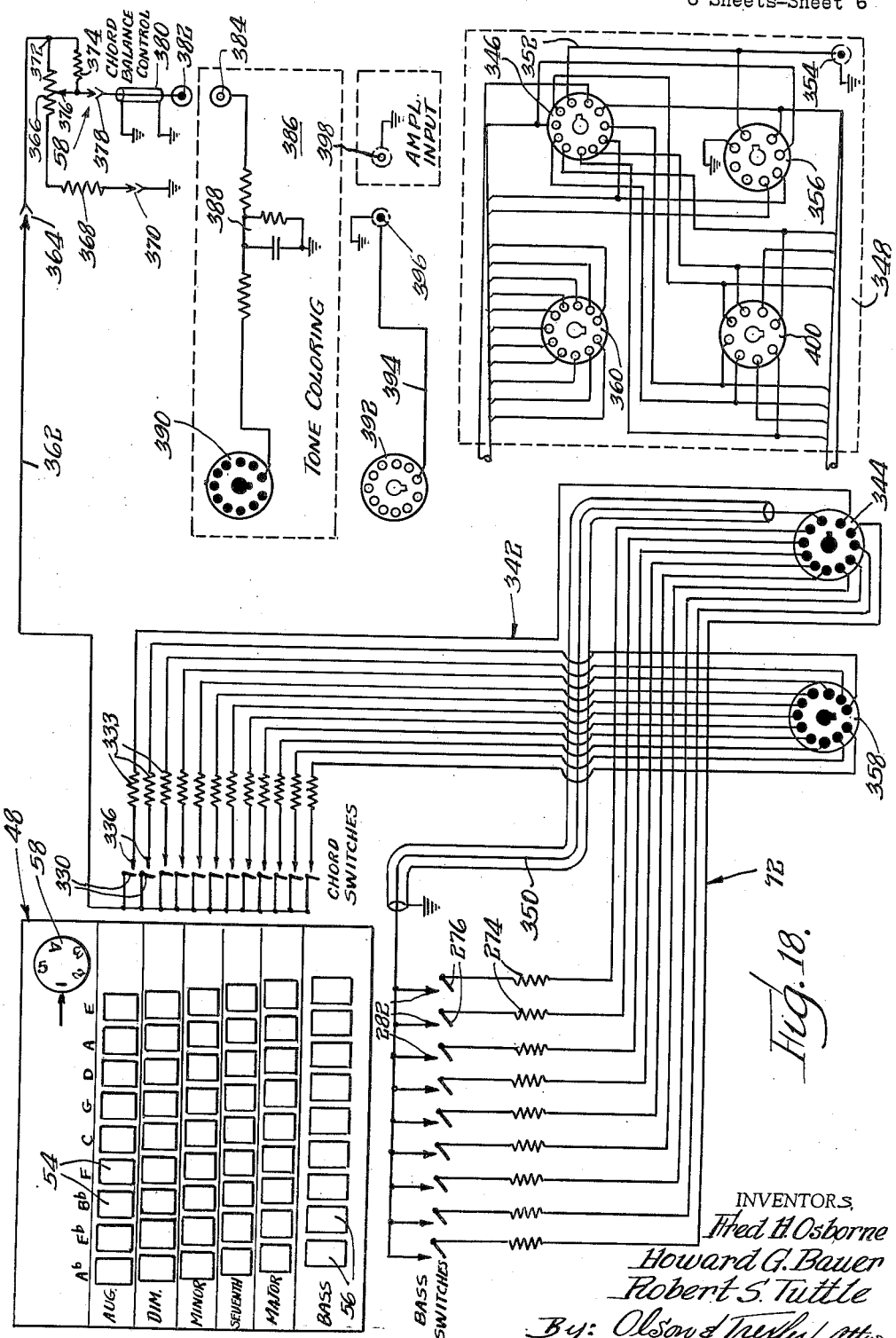

United States Patent Office 2,969,704
Patented Jan. 31, 1961

2,969,704
MECHANISM FOR PLAYING CHORDS

Fred H. Osborne, Snyder, Howard G. Bauer, Tonawanda, and Robert S. Tuttle, Eggertsville, N.Y., assignors to The Wurlitzer Company, North Tonawanda, N.Y., a corporation of Ohio Filed July 8, 1958, Ser. No. 747,288

19 Claims. (Cl. 84—443)

This invention relates generally to the musical arts, and is concerned more particularly with a unit for playing chords in an electronic musical instrument.

As is well known to those skilled in the musical arts, it is common practice in the keyboard instruments, such as the piano and the organ, to play the melody with the right hand, and to play combinations of notes or chords with the left hand. Learning to play the proper chords is quide difficult for many people, and many prospective musicians just do not care to take the time and trouble to learn to play chords. Accordingly, various devices have been developed whereby the pianist or organist need only depress a selected one or more members for selectively playing chords, each of the members being connected in such manner as to play a separate chord. In the case of electronic musical instruments, the buttons are utilized to connect groups of switches that have been set up in proper fashion to connect the output of various tones of the keyboard to play the proper chords. As will be appreciated by those skilled in this art, there are generally only three or four chords to be played for any particular composition, and hence the musician need not be concerned with remembering which of a large number of buttons to push for any given composition.

It is an object of this invention to provide a unit to be plugged in to an electronic musical instrument for playing chords in such instrument.

Another object of this invention is to provide mechanism for playing chords in an electronic musical instrument, which mechanism is of rugged construction and is simple and economical to fabricate.

Yet another object of this invention is to provide chord playing mechanism for an electronic musical instrument which utilizes a great many of duplicated or multiplied identical parts, but differently controlled, for simplicity and economy of construction.

Other and further objects and advantages of the present invention will be apparent from the following description when taken in connection with the accompanying drawings wherein:

Fig. 3 is a vertical sectional view on an enlarged scale through the chord playing unit as taken substantially along the line 3—3 in Fig. 2;

Fig. 4 is an elevational view of the chord playing unit with the cover removed as taken substantially along the line 4—4 in Fig. 8, parts being shown in section;

Fig. 5 is a rear elevational view taken substantially along the line 5—5 in Fig. 8, certain portions thereof being shown in section;

Fig. 6 is a top or plan view taken substantially along the line 6—6 in Fig. 3, with portions removed for clarity of illustration;

Fig. 7 is a plan view on an enlarged scale of a printed circuit board used in connection with the wiring for playing bass notes;

Fig. 8 is a vertical sectional view taken along the line 8—8 in Fig. 6;

Fig. 9 is a fragmentary perpespective view on an enlarged scale showing one mechanism for playing a particular chord;

Fig. 10 is a fragmentary vertical sectional view as taken along the line 10—10 in Fig. 8, parts being broken away;

Fig. 11 is an oblique sectional view taken along the line 11—11 in Fig. 8;

Fig. 12 is a fragmentary perspective view showing one mechanism for playing a bass note;

Fig. 13 is a vertical sectional view on an enlarged scale from the left end of the chord unit as taken along the line 13—13 in Fig. 2;

Fig. 14 is a fragmentary vertical sectional view as taken substantially along the line 14—14 in Fig. 13;

Fig. 15 is a fragmentary perspective view on an enlarged scale taken from beneath the chord playing unit and showing certain details thereof;

Fig. 16 is a fragmentary perspective view on an enlarged scale showing the fixed portions of the chord switches;

Fig. 17 is a perspective view on an enlarged scale showing the movable portions of the chord switches, and Fig. 18 is a schematic wiring diagram of the chord playing unit.

Figure 1:
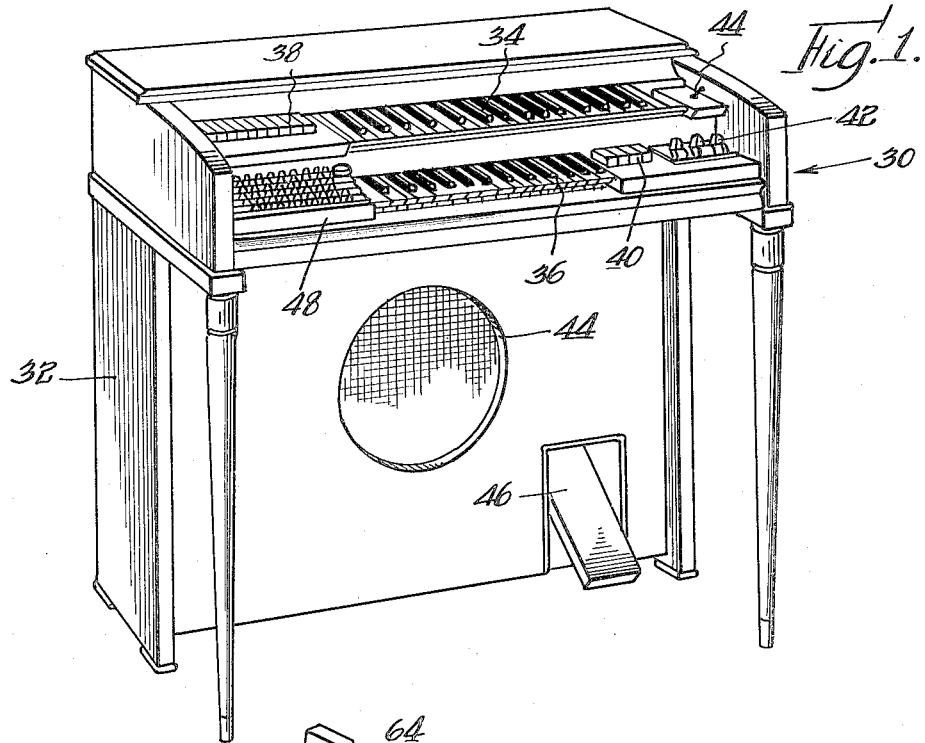
Fig. 1 is a perspective view of an electronic organ including a chord playing unit embodying the principles of this invention.

Referring now in greater particularity to the drawings, and first to Fig. 1, there is shown an electronic organ designated generally by the numeral 30. The organ includes a case 32 having an upper keyboard or manual 34, and a lower keyboard or manual 36. The organ also includes upper stop tablets 38 and lower stop tablets 40, along with further controls 42 and an on-off switch 44. The organ is provided with a loud speaker at 44, and with a swell pedal 46. The organ is of the type generating individual electrical oscillations to be transduced by the loudspeaker, preferably having individual electronic oscillators.

The organ, as shown, also incorporates a chord playing unit 48. The chord unit 48, as more clearly shown in Fig. 2, comprises a cover 50, which for example, may be molded of plastic. The cover has a stepped upper surface 52 through which a plurality of chord playing buttons 54, and a plurality of base buttons 56 project. The chord buttons are arranged in horizontal rows of nine buttons each, and staggered columns of five buttons each. The buttons are stepped in accordance with the stepped top surface of the cover 50, and the base buttons 56 project through the cover in the bottom stepped portion. There are nine such bass buttons arranged in a horizontal row. The vertical columns of buttons correspond to the various keys, being labelled in the drawing, and reading from left to right $A_b$, $E_b$, $B_b$, F, C, G, D, A and E. The horizontal rows correspond to the usual chords being, respectively, "Augmented," "Diminished," "Minor," "Seventh" and "Major." Thus, for example, the third chord button down in the fourth column from the left comprises the minor chord in the key of F.

The stepped and staggered arrangement of the keys helps the organist to ascertain the proper keys readily by touch without the necessity of looking at the keys. As a further aid in touch location, alternate vertical columns of the chord buttons are provided with dimples on the tops of the buttons, except for the uppermost row.

Figure 2:
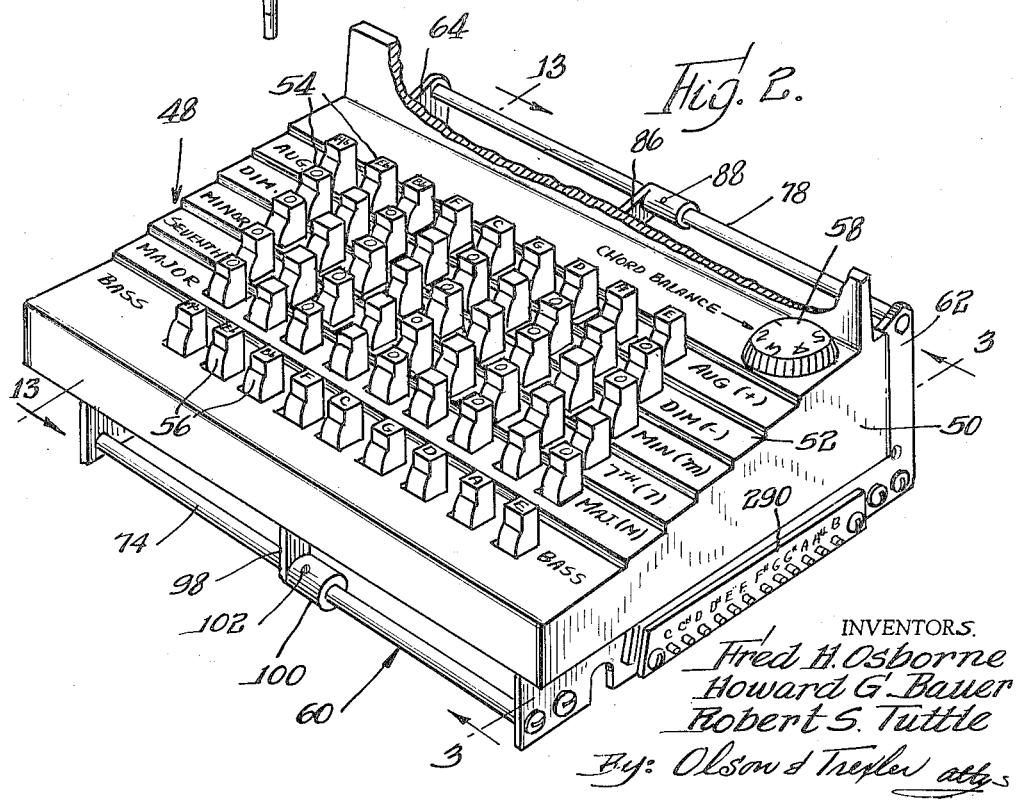
Fig. 2 is a perspective view on an enlarged scale of the chord playing unit, a part thereof being broken away.

As shown in Fig. 2, the chord unit also includes a chord balance control 58. This balance control is in the nature of a volume control for determining the amplitude of the chords relative to the other tones being played on the organ. The electrical construction thereof will be discussed subsequently with regard to the schematic wiring diagram.

As may be seen in part in Fig. 2, and more particularly in Figs. 3–6 and 13, the chord unit also includes a frame designated generally by the numeral 60. The frame 60 is made of metal, conveniently steel, and comprises a right end plate 62 and a left end plate 64. These two end plates are of similar construction, and are generally each in the form of a right trapezium, being higher at the back end of the frame then at the front. The front and back edges are vertical and parallel to one another, while the upper edges are inclined at a shallow angle to the horizontal, the lower edges being substantially horizontal. Both the right and left end plates are provided with central, horizontally elongated rectangular apertures 66 to provide clearance space for other parts hereinafter to be set forth. Furthermore, the bottom edges of the end plates are provided with horizontally elongated recesses 68 to provide clearance for other parts. A more or less U-shaped recess or slot 70 also is provided, near the front edge of each of the end plates. In the case of the left end plate 64, the slot or recess 70 serves as an entrance space for a connecting cable 72. The slot or recess 70 in the right end plate 62 is not used, but is provided inasmuch as it is simpler to make the two plates identical.

The end plates 62 and 64 are held in spaced apart parallel relation by three horizontal rods. Thus, a front rod 74 is disposed near the lower front corners of the two plates, and is secured thereto by screws 76 passing through suitable apertures in the end plates, and threaded into tapped bores in the rod 74. Lock washers preferably are placed beneath the heads of the screws. A lower rear bar or rod 78 is secured near the rear lower corners of the plates by screws 80, and an upper rear bar 82 is secured near the upper rear corners of the plates by means of screws 84.

A longitudinal stiffening rib 86 extends between the front rod or bar 74 and the upper rear bar or rod 82. The stiffening rib comprises a heavy sheet metal strip having a sleeve or collar 88 fixed at the upper end thereof. This sleeve or collar is received on the rod 82, and is secured somewhat to the left of center thereof by a set screw 90. The stiffening rib is provided with intermediate obliquely offset section 94 locating the lower portion 96 of the rib near the center of the chord unit. The major portion of the rib extends diagonally downward substantially parallel to the upper edges of the end plates 62 and 64. The stiffening rib is terminated at the front or lower end by a vertically downwardly directed leg 98 having a sleeve or collar 100 fixed thereon, and secured in place on the front rod or bar 74 by a set screw 102.

Mounting feet or brackets 104 are provided near the four corners of the frame. The feet or brackets 104 comprise angular brackets having vertical arms secured to the end plates 62 and 64 by means of screws 106 extending through the end plates and threaded into the vertical arms. The vertical arms are provided with horizontally deflected tips or fingers 108 of reduced width, and these fingers project through suitable apertures 110 in the end plates to prevent the feet or brackets from twisting about the respective mounting screws. The feet or brackets 104 also have horizontal arms, and these are provided with tapped apertures for receiving screws 112 which are passed through suitable mounting structure in the organ 30.

The frame 60 also includes a pair of upper mounting plates, respectively comprising a right mounting plate 114, and a left mounting plate 116. The mounting plates 114 and 116 are of similar construction, and are generally obliquely disposed, substantially parallel to the upper edges of the end plates 62 and 64. The mounting plates are secured to the end plates adjacent the opposite ends of the mounting plates by means of screws 118 extending through suitable apertures in the mounting plates and received in tapped apertures in the end plates. The diagonal lower edges of the mounting plates 114 and 116 are relieved at 120 to provide a clearance space in the right mounting plate 114, as will be apparent hereinafter.

The mounting plates 114 and 116 are provided adjacent the lower or front ends with brackets 122 having vertical plates spot welded to the mounting plates 114 and 116, and further having apertured, horizontal ears extending therefrom. Further brackets 124 are provided near the upper or rear ends of the mounting plates 114 and 116. These brackets 124 comprise vertical plates spot welded to the mounting plates 114 and 116, and further include apertured horizontal ears positioned below the adjacent portions of the mounting plates, and below the ears of the brackets 122. Screws 126 are passed through the apertures in the horizontal ears of the brackets 122 and 124, and are threaded into threaded fittings 128 mounted in the cover or housing 50 for securing the latter detachably in place on the frame 60.

The chord unit also includes a plurality of sliding switch actuators extending generally from the back to the front of the unit, parallel to the end plates 62 and 64, and in spaced apart, parallel relation. These actuators 130 are stamped of sheet material, preferably metal, and are of absolutely identical configuration, thereby affording a great savings in production. The bottom edge 132 of each actuator 130 is essentially horizontal, but the major portion thereof is stepped, including a short riser portion 134 inclined at a shallow angle to the vertical, and a substantially wider tread portion 136 inclined at a shallow angle to the horizontal. The upper portion or edge 138 of each actuator is diagonal or inclined, being substantially parallel to the upper edges of the end plates 62 and 64. Adjacent the rear portion of each actuator 130, the oblique or diagonal upper edge 138 joins a downwardly inclined upper edge 140. A plurality of holes 142 is spaced just below the upper edges 138. These holes correspond in number to the chord buttons, and in the illustrative embodiment there are five such holes. Only one hole is used in each actuator, but the five different holes allow the forty-five different actuators to be of identical construction.

Each actuator 130 is provided near the lower forward corner thereof with a forwardly extending strip 144 having a downwardly depending foot 146 next to it. An insulating strip 148, such as of phenolic resin, extends across the chord unit, having relatively restricted lugs 150 at the ends thereof received in slots 152 in the end plates 62 and 64, and mounting the insulating member or guide 148 tilted from the vertical. The insulating member or guide 148 is provided with a plurality of slots 154 along its upper edge, and the strips 144 of the various actuators 130 are received in these slots for supporting and guiding the front portions of the actuators. Another insulating member or retainer 156 lies above the strips 144, and is secured at the opposite ends to the guides 148 by means of screws 158 extending through the guide 148 and threaded into depending end portions on the insulating retainer 156. The retainer 156 prevents the strips 144 from moving up out of the slots 154. As will be observed in Fig. 8, a metal angle member 160 extends along the insulating guide 148, being secured thereto for strengthening purposes.

An insulating guide 162, as of phenolic resin, extends across the back of the chord unit from end plate to end plate. This insulating guide is of strip-like construction, similar to the guide 148, and also has extending tongues or lugs 164 received in suitable slots in the end plates 62 and 64 to mount the guide 162 almost in parallelism with the guide 148. The guide 162 is provided with pairs of aligned vertical slots or notches 166 opening along its upper and lower edges. The rearwardly projecting portions of the actuators 130 are bifurcated to provide a pair of spaced apart arms 168 received in the aligned pairs of notches 166 for guiding the back ends of the actuators.

The guide 162 has a reinforcing metal angle member 170 secured to the rear surface thereof. This angle member has a more or less vertical flange of substantially the same height as the spacing between the slots 166, and also has a rearwardly extending, more or less horizontal flange. A pair of posts 172 substantially at the opposite ends of the guide 162 mounts a back stop 174 in spaced, parallel relation adjacent the guide 162. The backstop is of sheet metal construction, and has a reinforcing flange 176 on the back surface thereof, and a front layer of felt or other resilient material 178 engageable by the rearmost extremity of the actuators 130, as at 180.

A spring anchor 182 extends between the end plates 62 and 64. The spring anchor comprises a double strip of spot welded sheet metal, having diverging flanges 184 along the rear edge thereof. These flanges are provided with a plurality of spaced apertures 186. The rearmost portion 180 of the actuator 130 is in each case provided with an upstanding ear 188. Each ear is provided with a pair of vertically spaced holes 190. Biasing springs 192 are stretched between the holes 190 and the holes 186 of the upstanding lugs and the spring anchor 182, respectively. The hole in the upper flange of the spring anchor and the corresponding upper hole 190 in the actuator are used for alternate actuators, the lower corresponding holes being used for the intermediate actuators, whereby to provide clearance for springs. These springs resiliently urge the actuators for the front of the chord unit.

A plurality of rods 194 extends between the mounting plates 114 and 116. The rods are mounted in spaced apart, parallel relation by means of screws 195 extending through the mounting plates 114 and 116 and tapped into the ends of the rods. The rods are of generally similar construction, and the upper six thereof serve as pivot rods, while the lower five serve as guide rods, there being eight such rods in all with rods 4, 5 and 6, counting from the rear for the sake of convenience, serving as guide rods as well as pivot rods.

The rods 194 all are of similar construction, being of uniform diameter, and having annular circumferential grooves 196 therein. These grooves are uniformly spaced in all of the rods, but are offset from one rod to another equal to the spacing between actuators 130. In the case of the upper six rods the annular grooves serve for pivoting levers hereinafter to be set forth, while in the case of the bottom five rods, the annular grooves serve as guides. Hence, due to the overlap in certain of the functions of some of the rods, the fourth, fifth and sixth rods from the top or back are provided with intermediate annular grooves 198 spaced equidistantly between previously mentioned annular grooves 196.

In addition to the foregoing, there is a bass guide rod 200 similar to the rods 194 and mounted at the extreme upper front corners of the mounting plates 114 and 116 by means of screws 202. The bass guide rod 200 is similar to the rod 194, and is provided with circumferential or annular grooves 204 serving as guides for parts hereinafter to be described.

Each of the chord buttons 54 is mounted on a lever or pivoted actuator identified generally by the numeral 206 and seen best in Figs. 8 and 9. Each lever comprises a substantially horizontal section or body 208 having an upstanding arm 210 thereon, the corresponding button 54 being mounted on the upper end of the arm 210. Each lever also includes near its front bottom corner a depending tooth 212 presenting an abutment surface or heel 214 engageable with the head 216 of a pin or rivet which is peened or riveted in appropriate one of the holes 142 in the corresponding actuator 130. Each lever 206 also includes at its rear portion an upstanding mounting structure comprising a hook shaped arm 218 received in an appropriate annular groove 196 of one of the rods 194. A lug 220 extends up adjacent the hook shaped arm 218 to prevent the latter from being displaced from the annular groove 196. The lug initially is coplanar with the arm 218, the entire lever 206 being stamped from sheet metal, and is bent over at substantially right angles to allow the arm 218 to be engaged in the appropriate slot 196. Subsequently the lug 220 is deflected up toward its initial position to prevent retraction of the arm 218. As will be apparent from the drawings the slit separating the lug 220 from the arm 218 in each case is terminated by a circular opening to prevent tearing of the metal at the root of the slit.

All of the levers 206 are identical, thus leading to economy and simplicity in manufacture. Succesive ones of the levers are pivoted on different rods 194. Thus, the extreme left lever is pivoted in the annular groove 196 at the left end of the uppermost rod 194. This lever engages the pin or rivet 216 of the leftmost actuator 130. The second lever 206 from the left is pivoted in the left annular groove of the second rod from the top, and so on through the first five levers. The arm 210 of each lever is arcuate in shape, and is received in an aligned annular groove 196 of the third rod displaced from the one on which the lever is pivoted. The leftmost vertical column of buttons 54 corresponds to the first five levers from the left.

The sixth lever from the left is pivoted in the second annular groove of the uppermost rod, the seventh lever being pivoted in the second annular groove from the left of the second rod from the top, and so on. This pattern is repeated completely across the chord unit, but as to the pivoting and as to the guiding of the levers.

A folded over rubber stop or bumper 222 is provided along the top edge of each horizontal body portion 208 for abutment beneath a corresponding rod 194. The levers are held up in this position by the springs 192 which act through the actuators 130 and the rivet or pin head 216 to bias the levers in an upward direction. Felt pads 224 are provided beneath the bottom surfaces of the buttons 54 for silent operation when the buttons bottom on the rods 194 upon depression of the buttons. As will be apparent from the drawings, the buttons 54 are provided with peripheral skirts 226 about their outer edges which positively prevent movement of the buttons up through the coresponding openings 228 in the stepped upper surface 52 of the housing 50.

As will be apparent, each time one of the buttons 54 is depressed the corresponding lever 206 is pivoted about its mounting rod 194, sidewise movement of the lever being prevented by receipt of the arm 210 in the corresponding annular groove 196. This causes the corresponding actuator 130 to be shifted toward the rear of the chord unit against the bias of the corresponding spring 192. The switch action produced thereby will be discussed shortly hereinafter.

Reference previously has been made to the bass buttons 56. These buttons are provided for playing bass notes, and substitute for the usual pedal clavier of an organ. The bass buttons 56 are mounted on bass levers 230 generally similar to the levers 206. The bass levers comprise bodies 232 which are longer than the bodies 208 of the previously mentioned levers, and are provided with downwardly offset or stepped intersections 234 in order to pass under adjacent parts. There is no structure corresponding to the teeth 212, since the bass levers 230 do not actuate any actuators corresponding to those of the chord levers. There is, however, an upstanding arcuate arm 236 corresponding to the arms 210. Each of the bass buttons 56, which is of similar construction to the chord buttons, is mounted on the corresponding one of the upstanding arms 236. Each lever 230 includes a forwardly extending arm 238 having a right angularly disposed flange 240 to which is riveted an insulating strip or plate 242 having a horizontal slot 244 near the bottom thereof, and serving as a bass switch actuator as will be brought out shortly hereinafter.

Each of the arms 236 is guided in one of the annular grooves 204 of the bass guide bar or rod 200. Each body portion 232 is provided with a rubber upstop or bumper 244 for abutting beneath the lowermost one of the rods or bars 194. Similarly, felts 246 are placed beneath the bass buttons 56 for quiet operation when the buttons bottom on the bass guide rod 200.

A spring anchor 248 comprising a sheet metal angle member extends between the two mounting plates 114 and 116, having longitudinally extending tongues 250 at the ends thereof received in siutable apertures near the upper corners of the mounting plates 114 and 116. The vertical flange of the spring anchor 248 is provided with holes 252 spaced in accordance with the spacing of the bass levers 230, and vehicle springs 254 are stretched between these holes and corresponding holes 256 in the horizontal bodies 232, whereby to bias the bass levers upwards with the rubber bumpers 244 in contact with the corresponding rod 194.

Reference now should be had to Figs. 4, 7, 8, 11 and 12 for an understanding of the bass switches, designated generally by the numeral 258. The bass switches comprise an insulating panel or strip 260 mounted parallel to the guide strip 148 and supported therefrom in spaced relation thereto by posts 262, comprising spacers and screws. The insulating strip 260 is of phenolic resin or the like, and comprises a printed circuit board having a plurality of diagonal conductive strips 264 on the back thereof. In the illustrative example, there is a total of nine such conductive strips, one for each bass switch. Each of the conductive sections or strips has a pair of apertures respectively through the opposite ends and extending through the insulating strip 260. A plurality of individual conductive spots 266 is provided, respectively in transverse alignment with the upper ends of the conductive strip 264, there being an aperture through each spot and through the insulating board. A conductive common member 268 extends substantially from end to end of the strip 260, being of more or less sinuous form to avoid the conductive sections 264 and spots 266. Holes 270 extend through the conductive common member 268 and through the insulating strip 260 at spaced intervals. Further holes 272 are provided at opposite ends of the strip for cooperation with the mounting posts 262.

Nine small resistors 274 have the leads at the opposite ends thereof respectively passed through the apertures at the upper end of the conductive strip 264 and through the apertures communicating with the conductive spots 266. The ends of the resistors are soldered in place, and individual lead wires of the cable 72 are soldered to the leads against the conductive spots 266. Flexible, movable switch contact wires or whiskers 276 are provided with bight portions 278 which are inserted through the lower holes extending through the conductive strip 264 and soldered in place. Transverse offset ends 280 integral with the bight sections limit the amount of insertion. The opposite ends of the wires 276 are passed through the apertures 244 in the insulating members or switch operators 242 mounted on the bass button levers 230. Fixed, flexible contact wires 282 have bight portions 284 inserted through the holes 270 in the conductive common member 268 and soldered to the common conductive member. Offset or deflected end portions 286 prevent the fixed contact wires 282 from being inserted too far into the holes 270. The opposite or outer ends of the wires 282 are provided with deflected tips or transverse sections 288 which underlie the movable contact wires 276, and normally are spaced therefrom. When one of the bass buttons 56 is depresed, the bass lever 230 on which it is mounted is pivoted downwards, thereby lowering the insulating member 242 and carrying the movable contact wire 276 into engagement with the transverse section 288 of the fixed contact wire 282. Further downward movement subsequent to initial engagement of the contact wires does no harm, due to the flexibility of both the movable and fixed contact wires.

Mechanism for operating the chord switches is shown in Figs. 3, 8, 9, 10 and 15. Such mechanism includes an insulating plate 290 of phenolic resin or the like secured by screws 292 to the end plate 62 over the recess or opening 68 therein. A similar insulating plate 294, but of double thickness, is mounted over the corresponding recess 68 in the opposite end plate 64. The insulating plates are provided with horizontally spaced apertures 296, there being twelve such apertures in each plate in the illustrative example. The apertures comprise a single horizontal row in each plate, and corresponding apertures of the two plates are aligned. Metal bushings 298 are inserted in the apertures to serve as pivots.

The chord unit is provided with a plurality of chord switch operators 300. These operators comprise metal strips or plates mounted transversely of the actuators 130 and having reduced height ends with longitudinally projecting tongues received in the bushings 298 for pivotally mounting the operators 300. The operators are provided at their opposite ends with integral pivot pins or lugs 302 and along the lower longitudinal edges with reinforcing flanges 304. The pins or lugs 302 are pivotally received in the bushings 298. The upper edges of the operators are disposed below the actuators 130, but the operators have upwardly projecting lugs or tongues 306 adapted to be engaged by the teeth 132 of the actuators 130. The width of each tongue (longitudinally of the operator 300) may be such as to be engaged by a tooth 132 of only one actuator 130, or it may be wide enough to be engaged by several actuators. Each tongue 306 is provided with a felt pad 307 extending on down toward the lower longitudinal edge for silent operation. The size and disposition of the tongues on the various operators is such that none of the operators is identical. Furthermore, generally speaking, the tongues are so disposed that the teeth of any given actuator 130 will engage tongues on more than one operator 300. Thus, when any chord button 54 is depressed, it will shift its corresponding actuator toward the rear of the chord unit, and somewhat downwardly. This will cause certain of the teeth 132 to engage tongues of certain of the operators 300, and thus to pivot the operators.

The operators are provided at their upper right corners with holes 308, and individual helical springs 310 are stretched between these holes and between holes 312 spaced along a spring anchor 314. The spring anchor comprises a sheet metal strip spot welded to the inner surface of the end plate 62 with the lower edge thereof depending into the opening 66 in the end plate, whereby this opening provides clearance for the springs. It will be appreciated that the recess 120 in the bottom edge of the right mounting plate 114 also provides clearance for certain of the springs 310. The springs 310 serve to hold the operators 300 in the position shown, as limited by abutment of the felt pads or strips 307 against certain of the actuator teeth.

At the ends of the operators 300 opposite to the springs 310, each operator is provided with an insulating sheet material member 316 having an upstanding tab 318. As can be seen clearly in Fig. 14, the tabs 318 are disposed toward the ends of the insulating members 316, and the insulating members are alternately reversed whereby adjacent tabs 318 are offset from one another longitudinally of the operators 300. Thus, as the operators pivot there is no interference between adjacent tabs. Each of the tabs is provided with a vertically elongated slot 320.

An insulating strip 322 (Figs. 5, 6, 13–15 and 17) is mounted in horizontal position along the inner face of the left end plate 64 by means of angle brackets 324 spot welded to the end plates 64, and to which the insulating strip is secured by means such as screws. The insulating strip comprises a printed circuit board having an elongated conductive path 326 on the upper surface thereof with a plurality of transverse branches 328 extending therefrom. Apertures are provided through the board communicating with the ends of the branches and with intermediate positions on the elongated conductor 326. Movable contact wires 330 are secured to the printed circuit board 322 by having folded over or bight portions 332 thereof inserted through the holes and soldered to the elongated conductor 326 and to the branch paths 328. The wires further are provided with deflected tips 334, and these tips are received in the openings 320 in the tabs 318 on the operators 300, whereby each wire will be deflected upon pivoting of the corresponding operator.

A further insulating strip or printed circuit board 327 is seen in Figs. 5 and 13–16, being mounted on the left end plate 64 and spaced therefrom substantially the thickness of the double insulating plate 294, being supported at the opposite ends by a screw and spacer arrangement 325, and partially overlapping the insulating member 294. The board 327 has on its outer surface a horizontal row of conductive spots 329 and has holes passing through the spots and the board. Disposed above the row of spots 329 and offset to one side therefrom is a series of diagonal conductive members 331 of short extent. The diagonal members have holes extending therethrough, and also through the board 327. Resistors 333 are mounted on the inner surface of the boards, with the leads extending through the spots 329 and the bottom openings in the diagonal conductors 331 and soldered thereto. Fixed contact wires 336 are mounted on the insulating board 327. The fixed contact wires are provided with transverse offset portions 338 connected to bass portions 340 having bights on the end thereof inserted through the holes in the tops of the conductor sections 331 and soldered thereto. Thus, the diagonal conductive strips 331 connect the fixed contacts 336 to the resistors 333. The fixed contact wires are disposed horizontally, and thus are transverse of the movable contact wires 330. Normally the movable contact wires are disposed out of engagement with the fixed contact wires. Upon pivoting of any of the operators 300, the corresponding movable contact wire 330 is deflected by the associated tab 318, whereby to engage the corresponding fixed contact wire. The lower ends of the resistors 333 are individually wired to the conductors of a branch of the cable 72 and identified by the numeral 342.

The electrical aspects of the invention are illustrated by the schematic wiring diagram of Fig. 18. Most of the parts therein have been shown heretofore and are identified by the same numerals. The cable 72 for the bass switches 276, 282 is connected to a plug 344 cooperable with a socket 346 in a junction unit 348 within the organ. The individual wires of the cable in all but one instance connect the pins of the plug 344 individually to the resistors 274 connected to the movable switch contacts 276 for applying electrical oscillations corresponding to musical tones throughout the musical switch contacts. When one or more of the bass switches are closed these oscillations are applied to the fixed contacts 282, and hence through a shielded lead 350, comprising a part of the cable 72, to pin 11 of the plug 344 and hence to a bass output line 352 in the junction unit 348. This line leads to a pin 354 to be plugged in to an audio amplifier in the organ. It will be observed that there is another socket 356 in the junction unit which has the eighth contact thereof connected to the bass or audio line 352. This is designed for connection to a pedal clavier, not shown.

The wires of the cable 342 are individually connected to the pins of a plug 358 cooperable with a socket 360 in the junction unit 348. The contacts of the socket 360, like the socket 346, are individually wired to the various tone generators in the organ. As will be understood, not all of the tone generators are wired through these sockets, but only selected ones. The wires of the cable 342 further are connected to the resistors 333, and hence to the fixed contacts 336 of the chord switches. When an appropriate one of the chord buttons is pushed, one or more of the movable switch contacts 330 will be moved into engagement with the corresponding switch contacts 336, whereby to connect the corresponding oscilations to a bus or collector line 362. The collector is connected to the chord balance control 58 through a detachable connector 364. The chord balance control comprises a potentiometer resistor 366 connected to a resistor 368, and hence through a detachable connector 370 to ground. The input 372 of the chord balance control is connected to a resistor 374, the other end of which is connected to a sliding tap 376 on a potentiometer resistor 366. The sliding tap further is connected through a detachable connector 378 to a shielded lead 380 leading to a pin 382 adapted for insertion in a jack 384 of a tone coloring unit 386. The jack is connected through a tone coloring filter 388 to pin 11 of a detachable plug 390, and this plug cooperates with a socket 392. Pin 11 of the socket is connected by a wire 394 to a pin or plug 396 cooperable with a jack 398 comprising the input of the audio amplifier in the organ.

In addition to the parts heretofore enumerated, it will be apparent that there is a socket 400 in the junction unit 348 which is cooperable with a plug associated with a pedal clavier, not shown, in the same fashion as the socket 356.

Although a great many chords can be played by depressing the various buttons 54, the operation of one such button will be set forth by way of example. Assuming that the fourth button down in the fifth column, namely the "Seventh" in the C column, is pushed, the twenty-fourth actuator 130 from the left will be advanced toward the rear of the chord unit, and also will move slightly down, as heretofore discussed. The teeth 132 of this particular actuator 130 will engage upstanding tabs or ears 306 of the second, fifth, eighth and twelfth operators 300, numbering from the back of the unit toward the front, the twelfth operator being the front one. This causes the corresponding switches to close, namely the second, fifth, eighth, and twelfth switches, from top to bottom in Fig. 18, or from back to front of the chord unit in the figures. Thus, four tones will be combined to produce the "Seventh" in the key of C. Other combinations are produced by the other chord buttons, as will be apparent to those skilled in the musical arts.

The chord unit as now fully disclosed is compact and rugged. The duplication of the actuators and of the button levers leads to simplicity and economy of fabrication, and makes it unnecessary for a dealer or service man to stock a large number of different parts. The plug-in connection make it possible for one to purchase the organ as an entity without the chord unit, and subsequently to plug in the chord unit as desired.

The specific embodiment of the invention as herein shown and described will be understood as being exemplary. Various changes in structure will no doube occur to those skilled in the art, and will be understood as forming a part of the invention insofar as they fall within the spirit and scope of the appended claims.

The invention is claimed as follows:

1. Mechanism for playing chords in an electronic musical instrument comprising a frame, a lever having a manually engageable part thereon for pivoting of said lever, means pivotally mounting said lever on said frame, actuating means, means on said frame mounting said actuating means substantially parallel to said lever for reciprocation relative to said frame substantially parallel to said lever, means operatively connecting said lever and said actuating means for reciprocation of said actuating means upon pivoting of said lever, electric switch means carried by said frame means for connecting electric tone oscillations to an output circuit, switch operating means movably carried by said frame, means operatively interconnecting said actuating means and said switch operating means for movement of said switch operating means upon reciprocation of said actuating means, and means operatively interconnecting said switch operating means and said switch means for operation of said switch means upon movement of said switch operating means.

2. Mechanism for playing chords in an electronic musical instrument comprising a frame, a plurality of parallel levers having manually engageable parts thereon for pivoting of said levers, means pivotally mounting said levers on said frame, actuating means, means substantially parallel to said levers on said frame mounting said actuating means for reciprocation relative to said frame substantially parallel to said levers, means operatively interconnecting said levers and said actuating means for selective reciprocation of said actuaing means upon pivoting of said lever means, electric switch means carried by said frame means for connecting electric tone oscillations to an output circuit, switch operating means movably carried by said frame, means selectively operatively interconnecting said actuating means and said switch operating means for selective movement of said switch operating means upon reciprocation of said actuating means, and means operatively interconnecting said switch operating means and said switch means for operation of said switch means upon movement of said switch operating means.

3. Mechanism for playing chords as set forth in claim 2 wherein the actuator means comprises a plurality of parallel actuators and the switch operating means comprises a plurality of operators, and further including projections on said operators, different operators having different projections, and means on said actuators engageable with the projections on said operators for operatively interconnecting said actuators and said operators.

4. Mechanism for playing chords as set forth in claim 3 wherein the engaging means on the actuators comprises a toothed edge on each actuator.

5. Mechanism for playing chords in an electronic musical instrument comprising a frame, a plurality of levers having manually engageable parts thereon for pivoting of said levers, means pivotally mounting said levers on said frame, a plurality of identical actuators, means on said frame mounting said actuators in substantial parallelism for reciprocation relative to said frame, means respectively operatively interconnecting said levers and said actuators for reciprocation of said actuators upon pivoting of said levers, electric switch means carried by said frame for connecting electric tone oscillations to an output circuit, switch operating means operatively connected to said actuators, and means operatively interconnecting said switch operating means and said switch means for operation of said switch means upon movement of said switch operating means, said operating means comprising a plurality of operators having projections thereon, the projections of different operators means comprising a plurality of operators having projections thereon, the projections of different operators being different as to size and location, said plurality of identical actuators having means thereon engageable with the projections of said operators, different ones of said actuators being differently engageable with the projections of said operators due to the differences in size and disposition of the projections on said operators.

6. Mechanism for playing chords as set forth in claim 5 wherein the means on the actuators for engaging the projections on the operators comprises corresponding toothed edges on said actuators, the toothed edges being engageable with the projections on the operators in accordance with the size and disposition of the projections.

7. Mechanism for playing chords as set forth in claim 6 wherein the actuators are mounted in close, parallel side by side relation, and wherein the operators are mounted transversely of the actuators and parallel to one another.

8. Mechanism as set forth in claim 6 wherein the operators are pivotally mounted on the frame.

9. Mechanism for playing chords in an electronic musical instrument comprising a frame, a plurality of levers having manually engageable portions thereon for pivoting of said levers, means pivotally mounting said levers on said frame, a plurality of identical actuators, a pair of spaced apart transverse members extending across said frame and supported thereby, said members having slots therein mounting said actuators in closely spaced, parallel side by side relation for reciprocation, means respectively operatively interconnecting said levers and said actuators for reciprocation of said actuators upon pivoting of said levers, electric switch means carried by said frame for connecting electric tone oscillations to an output circuit, switch operating means movably carried by said frame, means operatively interconnecting said actuators and said switch operating means for movement of said switch operating means upon reciprocation of said actuators, and means operatively interconnecting said switch operating means and said switch means for operation of said switch means upon movement of said switch operating means.

10. Mechanism as set forth in claim 9 wherein the transverse members and the cooperating portions of the actuators are tilted somewhat from the horizontal, whereby the actuators move on a path tilted from the horizontal.

11. Mechanism as set forth in claim 10 wherein the switch operating means are positioned below the actuators and have upward projections thereon, and wherein the actuators have teeth along their lower edges engageable with the projections, the projections on different ones of said operating means being of different size and disposition whereby different ones of said operating means will be moved by different ones of said actuators.

12. Mechanism for playing chords in an electronic musical instrument comprising a frame, a plurality of electric switches carried by said frame for connecting electric tone oscillations to an output circuit, a plurality of switch operators, means on said frame movably mounting said switch operators for operation of said switches, said operators being supported from said frame in closely spaced relation and each having at least one projection thereon, the projections of different operators being of different size and position, and a plurality of manually operable means having parts thereon engageable with said projections, the size and position of said projections determining which of said projections will be engaged by which of said manually operable means.

13. Mechanism as set forth in claim 12 wherein the operators are pivotally mounted and the projections thereon are transverse, and wherein the parts of the manually operable means engageable with the projections are movable transversely of said operators for selectively pivoting the operators upon engagement with said projection.

14. Mechanism for playing chords as set forth in claim 12 wherein the plurality of manually operable means are substantially identical.

15. Mechanism for playing chords in an electronic musical instrument comprising a frame, a plurality of identical levers having manually engageable parts thereon for pivoting of said levers, means pivotally mounting said levers on said frame, a plurality of actuators, means on said frame mounting said actuators for reciprocation relative to said frame, means respectively pivotally interconnecting said levers and said actuators for selective reciprocation of said actuators upon pivoting of said levers, electric switch means carried by said frame for connecting electric tone oscillations to an output circuit, switch operating means movably carried by said frame, means operatively interconnecting said actuators and said switch operating means for selective movement of said switch operating means upon reciprocation of said actuators, and means operatively interconnecting said switch operating means and said switch means for operation of said switch means upon movement of said switch operating means.

16. Mechanism as set forth in claim 15 wherein all of the actuators are identical.

17. Mechanism as set forth in claim 16 wherein all of the actuators are aligned, being mounted in closely spaced, parallel side by side relation, wherein the pivotal mounts of adjacent levers are offset parallel to said actuators, said levers being disposed in closely spaced side by side parallel relation, and wherein the means operatively interconnecting the levers and the actuators is positioned at different locations for successive cooperating actuators and levers.

18. Mechanism as set forth in claim 17 wherein the means on the frame pivotally mounting the levers comprises a plurality of pivot rods extending across said frame transversely of said levers and said actuators and laterally spaced apart in parallel relation.

19. Mechanism as set forth in claim 18 wherein said rods are provided with annular grooves, some of said grooves pivotally receiving said levers, and others of said grooves receiving portions of said levers spaced from the pivotal mounting thereof and serving as guides.

References Cited in the file of this patent

UNITED STATES PATENTS

| | | |
|---|---|---|
| 2,046,082 | Mills | June 30, 1936 |
| 2,645,968 | Hanert | July 21, 1953 |
| 2,684,745 | Blodgett | July 27, 1954 |

UNITED STATES PATENT OFFICE
CERTIFICATION OF CORRECTION

Patent No. 2,969,704            January 31, 1961

Fred H. Osborne et al.

It is hereby certified that error appears in the above numbered patent requiring correction and that the said Letters Patent should read as corrected below.

Column 1, line 23, for "quide" read -- quite --; column 2, line 6, for "perpespective" read -- perspective --; column 6, line 37, for "but" read -- both --; column 7, line 17, for "siutable" read -- suitable --; line 75, for "depresed" read -- depressed --; column 9, line 65, for "throughout" read -- through --; column 11, lines 20 and 21, strike out "substantially parallel to said levers" and insert the same after "means" in line 22, same column; lines 64, 65 and 66, strike out "means comprising a plurality of operators having projections thereon, the projections of different operators".

Signed and sealed this 11th day of July 1961.

(SEAL)
Attest:
ERNEST W. SWIDER
Attesting Officer

DAVID L. LADD
Commissioner of Patents